United States Patent [19]

Okada et al.

[11] 4,294,428
[45] Oct. 13, 1981

[54] BUTTERFLY VALVE

[75] Inventors: Yoshitsugu Okada; Osamu Nakai, both of Hirakata, Japan

[73] Assignee: Kubota, Ltd., Osaka, Japan

[21] Appl. No.: 212,465

[22] Filed: Dec. 3, 1980

Related U.S. Application Data

[63] Continuation of Ser. No. 892,342, Mar. 31, 1978, abandoned.

[30] Foreign Application Priority Data

| Apr. 1, 1977 | [JP] | Japan | 52-37985 |
| Apr. 1, 1977 | [JP] | Japan | 52-41104 |
| Apr. 6, 1977 | [JP] | Japan | 52-40205 |

[51] Int. Cl.³ .......... F16K 31/44; F16K 1/22; F16K 41/02
[52] U.S. Cl. .................. 251/214; 251/307; 277/27; 277/189
[58] Field of Search ............. 251/214, 307; 277/188 R, 189, 27

[56] References Cited

U.S. PATENT DOCUMENTS

| 402,267 | 4/1889 | Meader | 277/188 R |
| 1,346,616 | 7/1920 | Treichel et al. | 308/36.1 |
| 2,851,315 | 9/1958 | Zavoda | 308/187.1 |
| 3,079,651 | 3/1963 | Hayman et al. | 277/237 |
| 3,393,917 | 7/1968 | Kendall et al. | 277/188 R |
| 3,974,855 | 8/1976 | Webb | 251/307 |
| 4,022,424 | 5/1977 | Davis et al. | 251/214 |
| 4,036,468 | 7/1977 | Webb | 251/307 |
| 4,139,204 | 2/1979 | Howe | 277/189 |

FOREIGN PATENT DOCUMENTS

| 2063281 | 7/1971 | Fed. Rep. of Germany | 251/214 |
| 2113392 | 10/1971 | Fed. Rep. of Germany | 277/188 |

Primary Examiner—A. Michael Chambers
Attorney, Agent, or Firm—Edwin E. Greigg

[57] ABSTRACT

A butterfly valve comprising a valve body mounted on a valve stem in a valve housing. The valve housing is provided with valve seats to contact the periphery of the valve body when the valve is closed. Elastic seal members are disposed between the end surfaces of the valve seats and the valve stem in a manner to surround the latter. The butterfly valve of the invention further comprises tubular holder members rotatable relative to the valve stem and fitted with the elastic seal members on outer parts thereof.

7 Claims, 16 Drawing Figures

BUTTERFLY VALVE

This is a Continuation of application Ser. No. 892,342 filed Mar. 31, 1978, now abandoned.

BACKGROUND OF THE INVENTION

1. Field of the Invention

This invention relates to a butterfly valve comprising a valve housing having bearing portions, a valve stem rotatably supported by the bearing portions, tubular bearing members slidably and fixably disposed between the bearing portions and the valve stem, a valve body mounted on the valve stem, a plurality of valve seats attached to the valve housing to contact the periphery of the valve body in a closed position, and elastic seal members to contact the bearing portions over the entire inner peripheral surfaces thereof, entire outer peripheral surfaces of annular recesses defined between the valve body and the valve stem, and, at both sides of the valve stem, the inner peripheral surfaces of the bearing portions, end surfaces of the valve seats, and the outer peripheral surfaces of the annular recesses, respectively, when the valve is closed.

2. Description of the Prior Art

A good leakproof condition may be maintained around the valve stem by having the elastic seal members contact the three elements, i.e. the inner peripheral surfaces of the bearing portions, the end surfaces of the valve seats, and the outer peripheral surfaces of the annular recesses.

In the prior art, each of the elastic seal members is pressed into a closed space defined between the above three surfaces and the valve stem. That is to say, the seal member is placed in direct contact with each of these elements that make relative rotations when the valve is opened or closed. Therefore, the valve stem is subjected to a great frictional resistance owing to the elasticity of the seal members at the time of opening and closing the valve, requiring a great driving force in operating the valve.

SUMMARY OF THE INVENTION

This invention intends to provide a very simple improvement to reduce the driving force for operating the valve without affecting the leakproof condition.

In a butterfly valve as described at the outset hereof, the invention is characterized by the arrangement in which the elastic seal members are fitted exteriorly on tubular holder members rotatable relative to the valve stem.

According to such arrangement, the elastic seal members and the valve stem are interposed by tubular holder members, the seal members elastically contacting the holder members, whereby the valve stem is rotated relative to the holder members with extremely small frictional resistance therebetween. The holder members may be spaced from the valve stem to eliminate the frictional resistance. In this way, the driving force for operating the valve has been greatly reduced, while retaining the conventionally known good leakproof condition by means of elastic seal members.

Another object of the invention is to facilitate insertion of the elastic seal members. Still another object of the invention is directed to improvement in the leakproof condition of the seal members.

Other objects and advantages of this invention will come clear from the following description.

DESCRIPTION OF THE PREFERRED EMBODIMENTS

Figure 1:
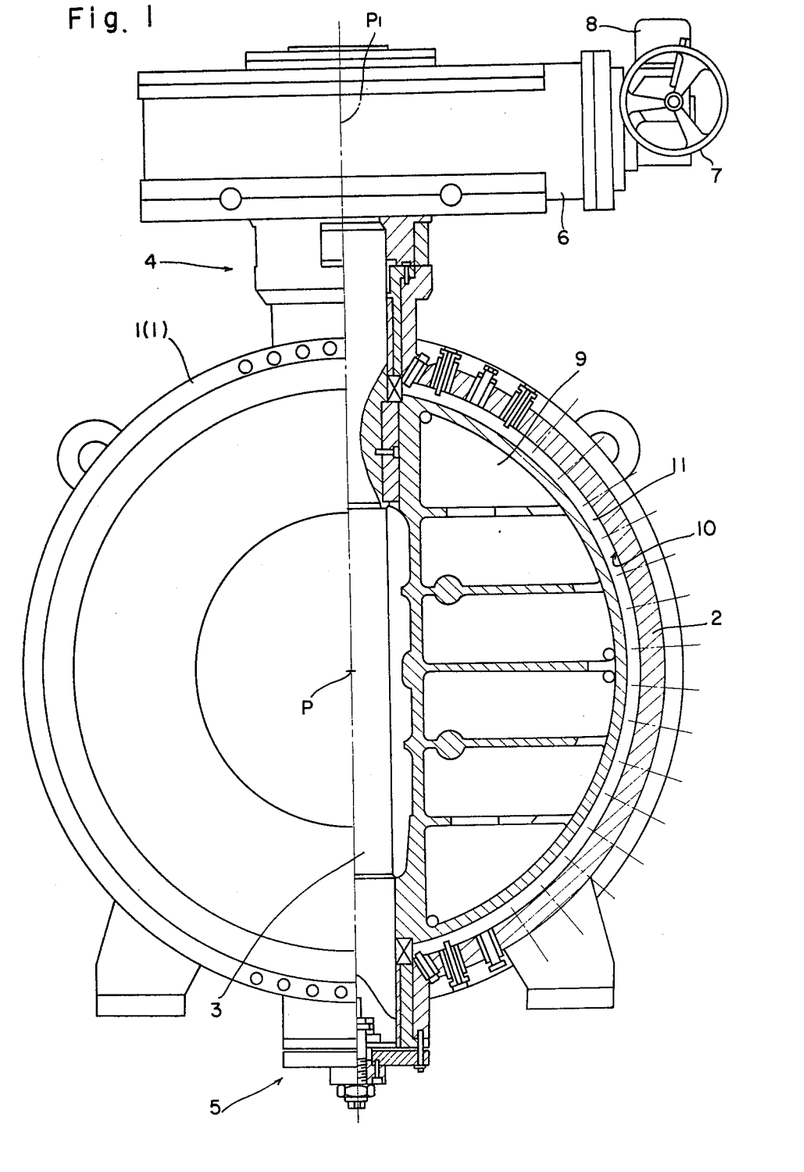
FIG. 1 is a partial sectional and elevational view showing a whole butterfly valve.

A cast-iron valve housing 2 has flanges 1 for coupling to pipes, and integral bearing portions 4, 5 for mounting a valve stem 3 having an axis P1 that crosses at right angles with a central axis P of the valve housing 2. The valve stem 3 has one end protruding from bearing portion 4.

A reduction means comprising a worm and a worm gear is contained in a casing 6. The worm is connected to a handwheel 7 and an electric motor 8, and the worm gear is splined with the protruding end of valve stem 3, whereby valve stem 3 is rotatable by manually operating handwheel 7 or by means of electric motor 8.

Valve stem 3 carries a disc shaped metal valve body 9 securely attached thereto. To completely close the fluid passage, valve body 9 assumes a position perpendicular or about perpendicular to the central axis P of valve housing 2. To completely open the fluid passage, valve body 9 assumes a position parallel or about parallel to the central axis P.

Valve housing 2 has an annular groove 10 defined on the inner surface to receive a pair of metal valve seats 11 which contact the periphery of valve body 9 in the closed position. Seats 11 are securely bolted in groove 10 in a manner to stop short of valve stem 3 to have two pairs of end surfaces thereof oppositely disposed across valve stem 3 with a space between each end surface and valve stem 3.

Figure 2:
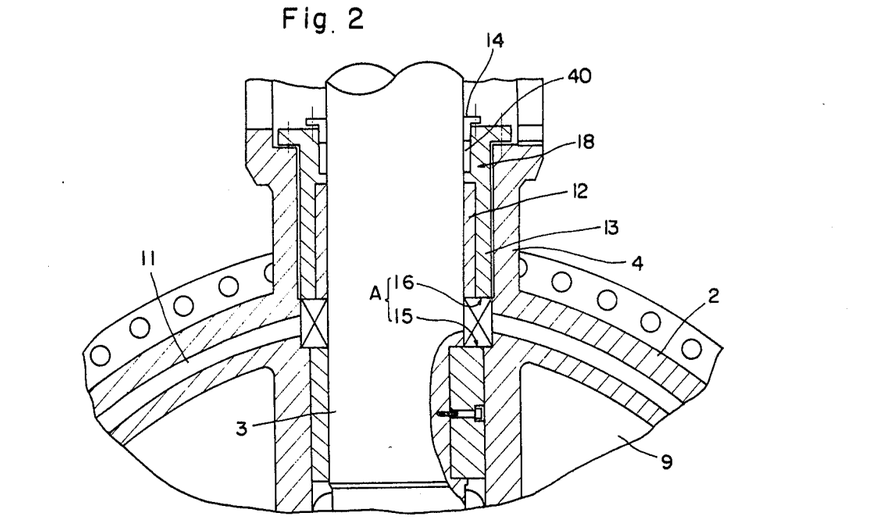
FIG. 2 and FIG. 3 are cross-sectional views each showing details of a bearing portion.

A bearing member 13 with a compressed bush 12 is slidably inserted between valve stem 3 and bearing portion 4, with the end surface facing the valve body 9 disposed outwardly from the outer periphery of valve seats 11. Bearing member 13 is pressed towards valve body 9 and fixed in position by means of bolts. Valve body 9 is recessed annularly about valve stem 3, and the recess 15 thus formed, together with a space 16 defined by valve stem 15, bearing member 13 and bearing portion 4, constitutes a closed space A to contain a sealing structure.

Bearing member 13 is formed with an annular recess at the upper part thereof. A seal member 40 is inserted between this recess and valve stem 3, and an annular element 14 is bolted to bearing member 13 to constitute an auxillary sealing structure 18.

Figure 3:
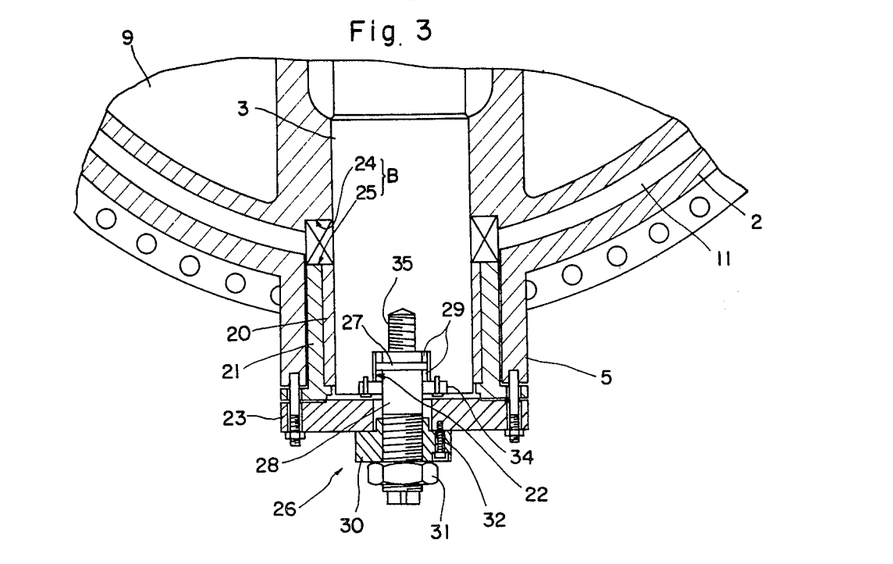
Figure 4:
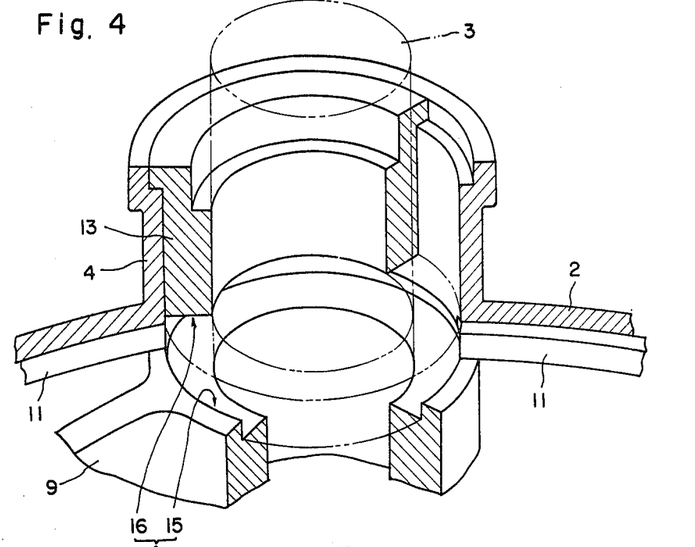
FIG. 4 is a partial sectional and perspective view showing one of the bearing portions.

A bearing member 21 with a compressed bush 20 is slidably inserted between valve stem 3 and bearing portion 5, with the end surface facing the valve body 9 disposed outwardly from the outer periphery of valve seats 11. Bearing member 21 is pressed towards valve body 9 and fixed in position by means of bolts and nuts via a cap 23. The position of valve stem 9 is axially adjusted and fixed by a mechanism 26 provided on cap 23 and valve stem 3. Valve body 9 is recessed annularly about valve stem 3, and the recess 24 thus formed, together with a space 25 defined by valve stem 3, bearing member 21 and bearing portion 5, constitutes a closed space B to contain a sealing structure.

The position adjusting and fixing mechanism 26 comprises a support member 28 having a threaded portion at one end and a collar 27 at the other end, the collar 27 being fitted with thrust rings on both sides. Support member 28 is fitted into a recess 22 at the end of valve stem 3 and held in position by a retainer member 34 so as to rotate only. The threaded portion of support member is fitted with cap 23, extending through a centre opening of the latter, and meshes with a rotatable member 30. Further, a locking nut 31 and a fixing bolt 32 are provided as shown. Thus, axial adjustment of valve stem 3, in other words, adjustment of contacting condition between valve seats 11 and valve body 9, is effected by rotating the rotatable member 30 using cap 23 as the reaction point. Valve body 9 is held in position, no movement axially of valve stem 3 being permitted, by fixing valve body 9 by cap 23 through thrust rings 29 and the sealing structure and by the sealing structure and bearing member 13 at bearing portion 4.

It should be noted that a threaded hole 35 defined at the end of valve stem at bearing portion 5 is for attaching an eyebolt to engage a crane hook when hanging valve stem 3.

The sealing structures mounted in the closed spaces A, B at bearing portions 4, 5 are identical and, for expediency, the one at bearing portion 4 will be described now.

Figure 5:
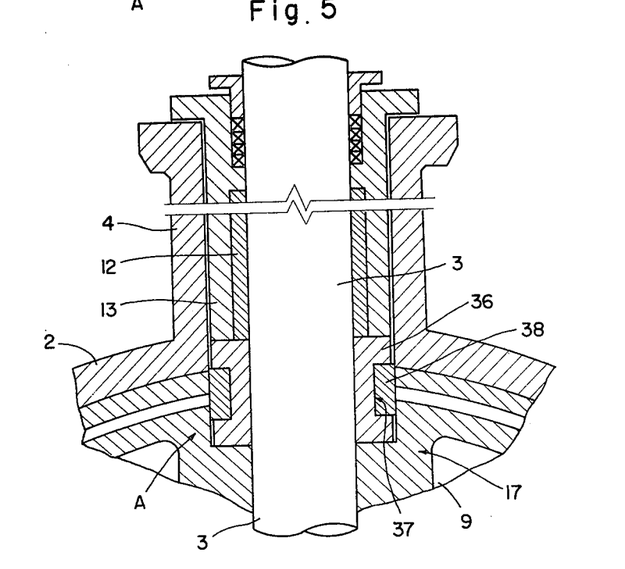
FIG. 5 is a sectional view showing a sealing structure.

As shown in FIG. 5, the sealing structure 17 comprises a tubular holder member 36 of metal and a tubular elastic seal member 38. The holder member has an outer diameter slightly smaller than the other diameter of the closed space A, and is adapted to fit tightly or loosely on valve stem 3. The holder member 36 is provided with an annular groove 37 extending from bearing portion 4 to recess 15 of valve body 9. The seal member 38 has an outer diameter slightly greater than the outer diameter of the closed space A, and is elastically fitted in annular groove 37. The elastic seam member 38 is pressed into the closed space A, undergoing deformation, prior to mounting of bearing member 13 on bearing portion 4.

The above arrangement permits elastic seal member 38 to contact the outer peripheral surface of recess 15 of valve body 9, the end surfaces of valve seats 11 and the inner peripheral surface of bearing portion 4 only, there being metal-to-metal contacts at the other parts. Holder member 36 may be held away from valve stem 3. Therefore, the valve is opened and closed with a small driving force as only a very small frictional resistance occurs.

An excellent leakproof condition is of course maintained when the valve is closed.

The holder member 36 may be bolted to be integral with bearing member 13 or bush 12.

Various modifications of the sealing structure are described next.

Figure 6:
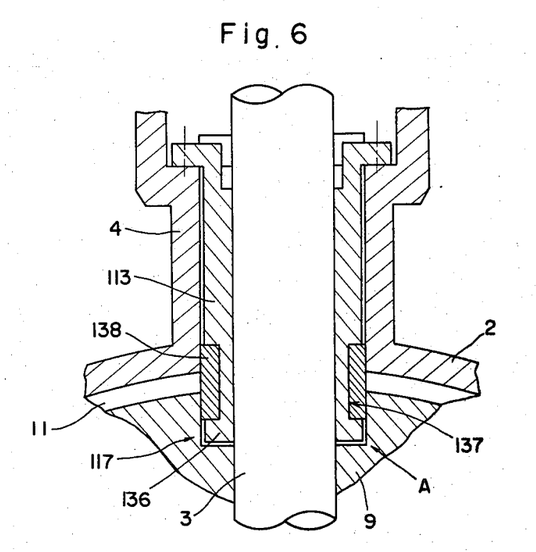
FIG. 6 is a sectional view showing a modified sealing structure.

One modified form of the sealing structure 117, as shown in FIG. 6, comprises a holder member 136 which is an extension of a bearing member 113 lying in closed space A. The holder member 136 is formed with an annular groove 137 on the periphery thereof to receive an elastic seal member 138. This arrangement permits the sealing structure 117 to be fitted in place at the time of mounting bearing member 113.

Figure 7:
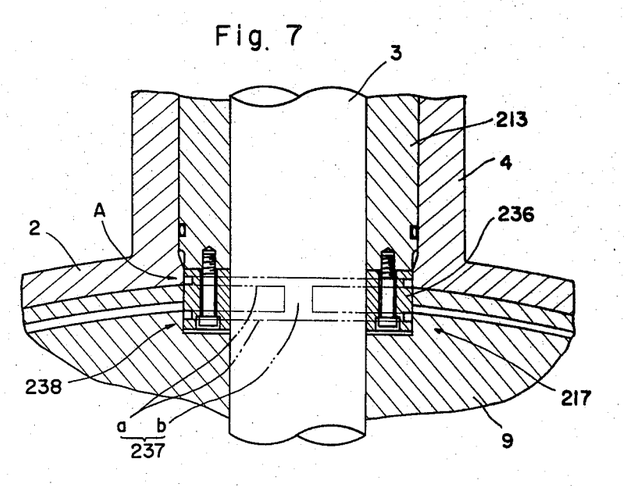
FIG. 7 is a partly sectional view showing a second modification of the sealing structure.
Figure 8:
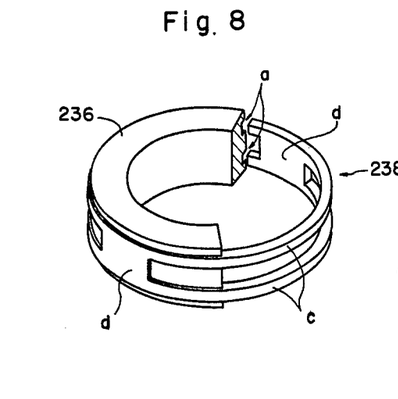
FIG. 8 is a partial broken away perspective view showing the sealing structure of FIG. 7.

A second modification of the sealing structure, as shown in FIG. 7, comprises a holder member 236 formed with a recess 237 consisting of annular grooves a opposed to the inner surface of bearing portion 4 and the outer periphery of annular recess 15, and grooves b opposed to the end surfaces of valve seats 11 when the valve is in the closed position and communicating grooves a. As shown in FIG. 8, an elastic seal member 238 comprising ring portions c and web portions d is inserted into recess 237, with the outer periphery thereof protruding from the outer periphery of holder member 236. The holder member 236 is bolted to bearing member 213, and elastic seal member 238 is pressed and deformed to fit into closed space A.

Figure 9:
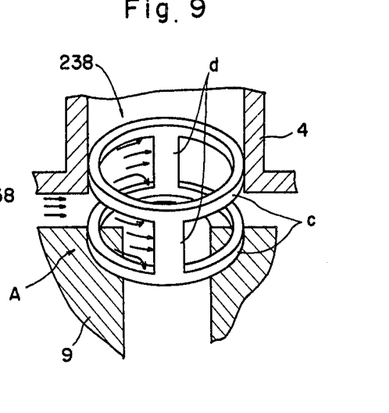
FIG. 9 is a view showing the flow control function of the sealing structure of FIG. 7.

This arrangement is capable of maintaining a highly leakproof condition by making use of fluid pressure in addition to the sealing action of elastic seal member 238 per se. This is illustrated in FIG. 9 in which the fluid pressure upstream of the valve in the closed position is shown acting in a space defined by ring portions c, web portions d and holder member 236 to press ring portions c and web portions d against the side wall of recess 237. A further advantage of this arrangement lies in a thin construction of the elastic seal member 238, which facilitates insertion thereof into recess 237, and into closed space A when sealing member 238 undergoes an intensive deformation for a highly leakproof condition.

In the case of the above arrangement too, the valve is opened and closed with a small driving force.

Ring portions c and web portions d may be separate bodies elastically inserted into recess 237 or attached thereto by liner material, bond or the like. Holder member 236 may be in a tubular form with an outer diameter corresponding to the bottom of recess 237, with the seal member 238 attached thereto by liner material or bond.

Figure 10:
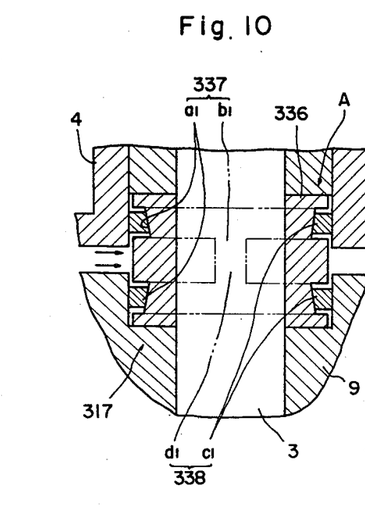
FIG. 10 is a sectional view showing a third modification of the sealing structure.

A third modification of the sealing structure 317, as shown in FIG. 10, is an improvement in part of the second modification capable of a still better sealing action by using fluid pressure. In FIG. 10, annular grooves a1 of recess 337 each have a canted bottom surface with the diameter thereof enlarged in the direction of an end of holder member 336, and the inner peripheral surfaces of ring portions c1 of elastic seal member 338 each have a shape fitting with the opposed one of the canted bottom surfaces of annular grooves a1. Elastic seal member 338 is inserted into recess 337 with the fluid pressure free sides of ring portions c1 spaced from the side walls of grooves a1, so that the fluid pressure acting axially of the holder member 336 causes ring portions c1 to have pressing forces in directions radial of holder member 336, thereby producing tight sealing effect.

The grooves b1 to receive web portios d1 may have slanted bottom surfaces gaining depth towards the fluid pressure receiving sides, and the inner surfaces of web portions d1 may be shaped to fit these slanted bottom surfaces, so that the fluid pressure cause web portions d1 to have pressing forces in directions radial of holder member 336.

In the second and third modifications, the holder member 236 or 336 may be defined by bearing member 213 or 313 or by bush 212 or 312.

Figure 11:
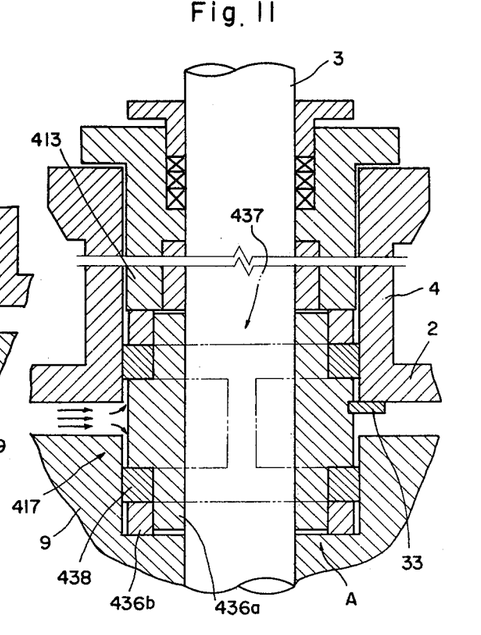
FIG. 11 is a sectional view showing a fourth modification of the sealing structure.
Figure 12:
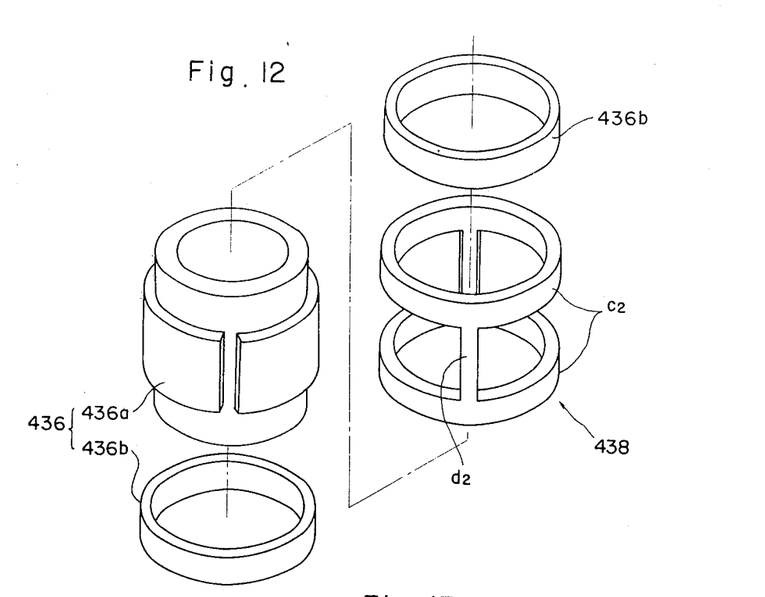
FIG. 12 is an exploded perspective view showing the sealing structure of FIG. 11.

In a fourth modification of the sealing structure 417 shown in FIGS. 11 and 12, a holder member 436 comprises a main body 436a having large diameter parts and small diameter parts, and rings 436b slidably fitted on the small diameter parts. The large diameter parts of main body 436a and rings 436b define portions of recess 437 to receive ring portions c2 of elastic seal member 438. The peripheries of ring portions c2 are arranged to protrude from the peripheries of main body 436a and rings 436b when ring portions c2 and web portions d2 of elastic seal member 438 and rings 436b are fitted on main body 436a. By means of a stopper 33 attached to valve housing 2, main body 436a is allowed to move axially of the holder member 436, but not to rotate. Thus, it is possible to change dimensions of the spaces between the large diameter parts of the main body 436a and rings 436b by adjusting the fixed position of tubular bearing member 413. That is, the amount of displacement of elastic seal member 438 is determined from outside the valve housing.

Such arrangement realizes a highly leakproof condition by adjusting the position of bearing member 413 even when elastic seal member 438 is placed in closed space A in a slightly displaced condition for easiness of assembly. Furthermore, when the sealing performance of seal member 438 deteriorates owing to its wear, this is made up by adjusting the amount of elastic displacement thereof. Thus, assembly work is made easy and a good leakproof condition is maintained for a long period of time.

Figure 13:
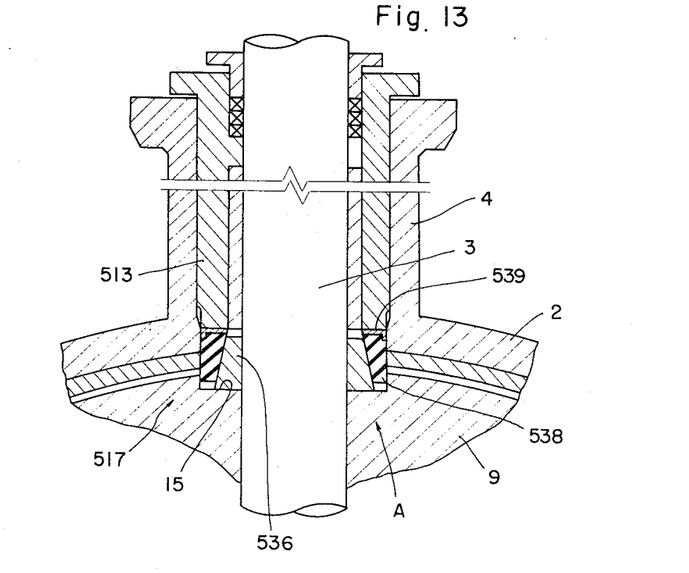
FIG. 13 is a sectional view showing a fifth modification of the sealing structure.

In a fifth modification of the sealing structure 517 shown in FIG. 13, valve stem 3 carries fitted thereabout a holder member 536 having a tapered outer surface diverging towards the bottom of recess 15, and holder member 536 carries fitted thereabout a tubular elastic seal member 538 having a tapered inner surface to contact the tapered outer surface of holder member 536 and a cylindrical outer surface extending from bearing portion 4 to recess 15. As inserted in closed space A, holder member 536 is spaced from a bearing member 513 and elastic seal member 538 is spaced from the bottom surface of recess 15. Thus, pressing forces against elastic seal member 538 acting radially of holder member 536 are adjustable by forcibly moving bearing member 513 towards valve body 9 and by the wedging action of the tapered surfaces in contact with one another.

Figure 14:
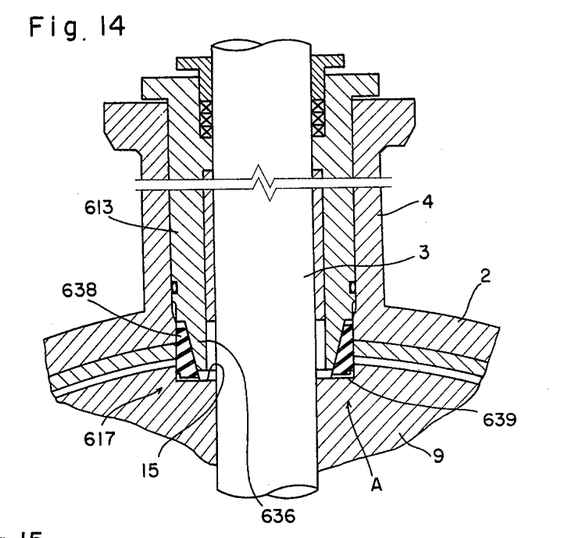
FIG. 14 is a sectional view showing a sixth modification of the sealing structure.

In a sixth modification of the sealing structure 617 shown in FIG. 14, a holder member 636 is an extension of a bearing member 613 lying in closed space A, the holder member 636 having a tapered outer surface converging towards the bottom surface of the recess 15. A tubular elastic seal member 638 is fitted to contact the tapered surface of holder member 636 and also the inner periphery of bearing portion 4 and the outer periphery of recess 15. As inserted in closed space A, holder member 636 is spaced from the bottom of the recess and elastic seal member 638 is spaced from bearing member 613. This arrangement produces an effect equal to that of the fifth modification.

In the fifth and sixth modifications, washers 539, 639 are provided respectively on the part of seal member 538 to contact bearing member 513 and on the part of seal member 638 to contact the bottom surface of the recess, in order to reduce frictional resistance at these contacts. Such provision contributes towards further reduction of the driving force for opening and closing the valve insomuch that a relative rotation occurs between bearing member 513 and seal member 538 and between valve body 9 and seal member 638.

Figure 15:
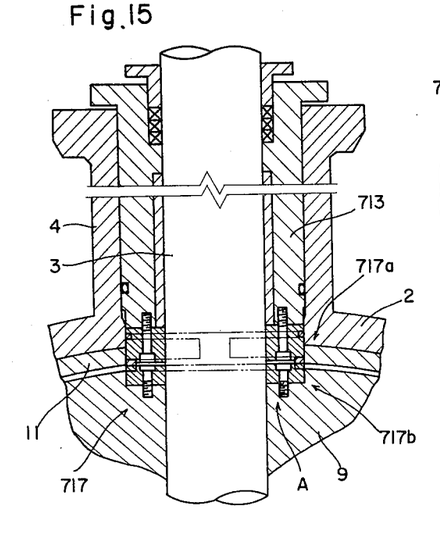
FIG. 15 is a sectional view showing a seventh modification of the sealing structure.
Figure 16:
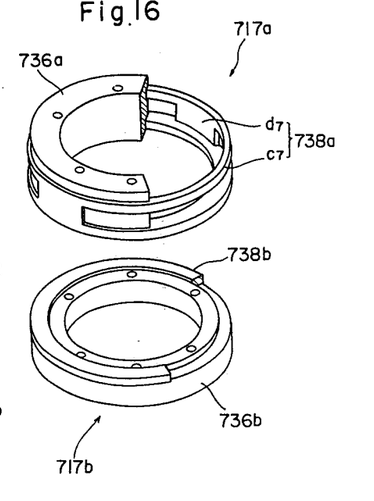
FIG. 16 is a partial broken away, exploded perspective view showing the sealing structure of FIG. 15.

A seventh modification of the sealing structure 717 shown in FIG. 15 comprises divided sealing structures 717a, 717b which contact one another at a position corresponding to the border between valve seats 11 and valve body 9 in the axial direction of the valve stem 3. As shown in FIG. 16, the first sealing structure 717a comprises a first seal member 738a having two ring portions c7 and two web portions d7, and a first holder member 736a for elastically mounting the first seal member 738a. The second sealing structure 717b comprises a second seal member 738b and a second holder member 736b for elastically mounting the second seal member 738b. The first sealing structure 717a is bolted to a bearing member 713 and the second sealing structure 717b is bolted to valve body 9. As pressed into closed space A, holder members 736a, 736b are spaced from one another to allow only seal members 738a, 738b to elastically contact one another at the position corresponding to the above-mentioned border. By adjusting the position of bearing member 713 to press sealing structures 717a, 717b, the first seal member 738a is pressed against the inner periphery of bearing portion 4 and the second seal member 738b is pressed against the outer periphery of recess 15 of the valve body, respectively all around the valve stem 3. When the valve is closed, the first seal member 738a is adapted to press against the inner periphery of bearing portion 4 and the end surfaces of valve seats 11 over a region extending from bearing portion 4 to the above-mentioned border.

In this sealing structure 717, the first seal member 738a is made of highly elastic soft material such as rubber, and the second seal member 738b is made of hard material, such as tetrafluoroethylene, which slips on the first seal member 738a with ease.

In the foregoing sealing structures already described, a shearing stress concentrates on the part of the seal member adjacent to the above-mentioned border. In the seventh modification, the elastic seal members 738a, 738b are free from such shearing stress owing to a relative movement therebetween occurring adjacent to the border, while there is no relative movement between valve seats 11 and the first sealing structure 717a or between valve body 9 and the second sealing structure 717b. Furthermore, as the second seal member 738b is made of hard material, the frictional resistance between the two seal members 738a, 738b is small compared with the case of having both of the seal members made of elastic material. This arrangement is capable of maintaining an excellent leakproof condition while making for less wearing and peeling between the two seal members 738a, 738b. The driving force for operating the valve is further reduced, and the elastic seal members may be used for a long period of time.

A further advantage of this modification is that the second seal member 738b of hard material is placed in recess 15 whereby the contacting surfaces of the two seal members are easily adjusted to the above-mentioned border.

What we claim is:

1. A butterfly valve comprising a valve housing having spaced bearing portions,
    a valve stem rotatably supported by said bearing portions said valve stem being axially adjustable in said bearing portions,
    a tubular bearing member disposed between at least one of said bearing portions and said valve stem,
    a valve body mounted on said valve stem,
    a tubular holder member including an elastic seal member having respective upper and lower ring portions retainable in respective annular recesses of the tubular holder member, said elastic seal member including at least one web portion interconnecting said upper and lower ring portions,
    said upper ring portion contacting the bearing portion and said lower ring portion contacting said valve body, said tubular holder member further contacting one of a plurality of valve seat portions of said valve body,
    said plurality of valve seat portions attached to said valve housing to contact a periphery of said valve body in a closed position,
    said elastic seal member fitted exteriorly on said tubular holder member contacting said bearing portions and being rotatable relative to said valve stem,
    said elastic seal member upper and lower ring portions being responsive to line fluid pressure for pressing the elastic seal member upper and lower ring portions against a side wall of said annular recesses when in a closed valve position.

2. A butterfly valve as defined in claim 1 further comprising fluid passages to apply fluid pressure between said ring portions upstream of the valve when the valve is closed, whereby said ring portions and said web portions respectively are pressed against the side walls of said recesses of said holder member.

3. A butterfly valve as defined in claim 2, wherein said recesses of said holder member have canted bottom surfaces, whereby fluid pressure acting on said ring portions axially of said holder member causes pressing forces to act radially of said holder member.

4. A butterfly valve as defined in claim 1, wherein portions of said recesses of said holder member for receiving said ring portions are defined between large diameter parts of said holder member and rings slidably fitted on small diameter part of said main bodies, the dimensions of the gaps between said large diameter part and said rings being adjustable by adjusting the position of said bearing member.

5. A butterfly valve as defined in claim 1, wherein each of said elastic seal member is of integral cylindrical form.

6. A butterfly valve as defined in claim 5 wherein the pressing forces on said elastic seal member acting radially of said tubular holder member are adjustable by adjustment of the fixed position of said tubular bearing member.

7. A butterfly valve as defined in claim 1, wherein each of said elastic seal member is divided into two parts at a position corresponding to a border between the ends of said valve seats and said valve body in a direction axial of said holder member, said holder member being adapted to support the divided parts of said seal member individually, one part of said seal member that contacts the inner peripheral surface of said bearing portion and the ends of said valve seats being formed of soft material and securely fixed, and the other part of said seal member being formed of harder material than said one part and adapted to rotate integrally with said valve body.

* * * * *